(12) United States Patent
Liang

(10) Patent No.: US 7,862,299 B1
(45) Date of Patent: Jan. 4, 2011

(54) TWO PIECE HOLLOW TURBINE BLADE WITH SERPENTINE COOLING CIRCUITS

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 913 days.

(21) Appl. No.: 11/726,334

(22) Filed: Mar. 21, 2007

(51) Int. Cl.
*F01D 5/18* (2006.01)
(52) U.S. Cl. ................................... 416/97 R
(58) Field of Classification Search ............... 416/97 R; 415/115
See application file for complete search history.

(56) References Cited

U.S. PATENT DOCUMENTS

| | | | | |
|---|---|---|---|---|
| 5,156,526 A * | 10/1992 | Lee et al. | ................... | 416/97 R |
| 5,165,852 A * | 11/1992 | Lee et al. | ................... | 416/97 R |
| 5,246,340 A * | 9/1993 | Winstanley et al. | ........ | 416/97 R |
| 5,387,085 A * | 2/1995 | Thomas et al. | ............. | 416/97 R |
| 5,484,258 A * | 1/1996 | Isburgh et al. | ............... | 415/115 |
| 5,538,394 A * | 7/1996 | Inomata et al. | ........... | 416/97 R |
| 5,702,232 A | 12/1997 | Moore | | |
| 5,931,638 A | 8/1999 | Krause et al. | | |
| 6,126,396 A * | 10/2000 | Doughty et al. | ........... | 416/97 R |
| 6,705,836 B2 * | 3/2004 | Bourriaud et al. | ......... | 416/97 R |
| 6,916,155 B2 * | 7/2005 | Eneau et al. | ............. | 416/97 R |
| 7,097,426 B2 * | 8/2006 | Lee et al. | ................... | 416/97 R |
| 7,217,092 B2 * | 5/2007 | Lee et al. | ................... | 416/97 R |
| 7,293,961 B2 * | 11/2007 | Lee et al. | ................... | 416/96 R |
| 7,296,973 B2 * | 11/2007 | Lee et al. | ................... | 416/97 R |
| 7,413,407 B2 * | 8/2008 | Liang | ........................ | 416/97 R |
| 7,481,623 B1 * | 1/2009 | Liang | ........................ | 416/97 R |
| 7,513,739 B2 * | 4/2009 | Boury et al. | ................. | 415/115 |
| 7,534,089 B2 * | 5/2009 | Liang | ........................ | 416/97 R |
| 7,611,330 B1 * | 11/2009 | Liang | ........................ | 416/97 R |
| 7,661,930 B2 * | 2/2010 | Deschamps et al. | ........ | 416/97 R |
| 7,704,048 B2 * | 4/2010 | Liang | ........................ | 416/97 R |
| 2005/0226726 A1 * | 10/2005 | Lee et al. | ................... | 416/97 R |
| 2005/0265837 A1 * | 12/2005 | Liang | ........................ | 416/97 R |

(Continued)

FOREIGN PATENT DOCUMENTS

CA        2550442 A1 *  12/2006

*Primary Examiner*—Edward Look
*Assistant Examiner*—Aaron R Eastman
(74) *Attorney, Agent, or Firm*—John Ryznic

(57) ABSTRACT

A turbine blade for use in a gas turbine engine, the blade being formed from two pieces bonded together along the blade chamber line to from a pressure side piece and a suction side piece. The pressure side piece includes a first serpentine flow cooling circuit with a first leg located on the suction side leading edge region and the second leg on the pressure side leading edge region with the last leg adjacent to the trailing edge region and connected to exit slots to discharge cooling air out the pressure side of the trailing edge. The suction side piece includes a second serpentine flow cooling circuit with a first leg adjacent to the trailing edge region and connected to suction side exit slots to discharge cooling air. The suction side serpentine circuit ends in a last leg adjacent to the first leg of the pressure side serpentine circuit with a row of film cooling holes to discharge cooling air from the last leg to the suction side airfoil surface for film cooling. The two serpentine flow circuits are separated from each other so that the cooling design can be flexible.

11 Claims, 7 Drawing Sheets

U.S. PATENT DOCUMENTS

| | | |
|---|---|---|
| 2006/0222495 A1* | 10/2006 | Liang ........................ 416/97 R |
| 2007/0048133 A1* | 3/2007 | Palmer et al. ............. 416/97 R |
| 2007/0059172 A1* | 3/2007 | Lee et al. .................. 416/97 R |
| 2007/0116570 A1* | 5/2007 | Boury et al. .............. 416/97 R |
| 2007/0122282 A1* | 5/2007 | Deschamps et al. ....... 416/97 R |
| 2007/0128032 A1* | 6/2007 | Lee et al. .................. 416/97 R |
| 2007/0128034 A1* | 6/2007 | Lee et al. .................. 416/97 R |
| 2007/0253815 A1* | 11/2007 | Kopmels et al. .......... 416/97 R |
| 2008/0056908 A1* | 3/2008 | Morris et al. ............. 416/97 R |
| 2009/0028702 A1* | 1/2009 | Pietraszkiewicz et al. ...... 416/1 |
| 2009/0068021 A1* | 3/2009 | Liang ........................ 416/97 R |
| 2009/0104042 A1* | 4/2009 | Liang ........................ 416/97 R |

* cited by examiner

TWO PIECE HOLLOW TURBINE BLADE WITH SERPENTINE COOLING CIRCUITS

BACKGROUND OF THE INVENTION

1. Field of the Invention

The present invention relates generally to fluid reaction surfaces, and more specifically to a two piece turbine airfoil with cooling circuits.

2. Description of the Related Art Including Information Disclosed Under 37 CFR 1.97 and 1.98

In a gas turbine engine, especially an industrial gas turbine engine, a compressor supplies compressed air to a combustor in which a fuel is burned to produce an extremely hot gas flow, which is then passed through a multiple stage turbine to extract mechanical energy used to drive an electric generator. The efficiency of the engine can be increased by passing a higher gas flow temperature into the turbine. However, the highest temperature of the turbine is limited to the material characteristics of the first stage stator vanes and rotor blades, since these are exposed to the highest temperature.

One method of allowing for a higher temperature on these first stage airfoils (blades and vanes) is to improve the cooling capabilities. Complex internal airfoil film cooling and impingement cooling circuits have been proposed to provide for improved cooling as well as to maximize the use of the cooling air.

FIG. 1 shows a prior art first stage turbine blade external pressure profile. The forward region of the pressure side surface experiences high hot gas static pressure while the entire suction side of the airfoil is at much lower hot gas static pressure than on the pressure side. FIG. 2 shows a prior art turbine blade with a 1+5+1 serpentine flow cooling circuit. The flow path for this 5-pass flow circuit is also shown in FIG. 1. The forward flowing 5-pass serpentine circuit is used in the airfoil mid-chord region. The cooling air flows toward and discharges into the high hot gas side pressure section of the pressure side. In order to satisfy the back flow margin criteria, a high cooling supply pressure is needed for this particular design, thus inducing high leakage flow. Since the second and third up-pass channels of the 5-pass serpentine cavities provide film cooling air for both sides of the airfoil, in order to satisfy the back flow margin criteria for the pressure side film row, the internal cavity pressure has to be approximately 10% higher than the pressure side hot gas side pressure which will result in over-pressuring the airfoil suction side film cooling holes. In the prior art 5-pass serpentine circuit, low aspect ratio flow channels are used. This lowers the ceramic core yield, making it difficult to install film cooling holes, high inference due to the rotational effect on internal heat transfer coefficient, and also yields low internal-to-hot gas side convective area ratio.

For the prior art highly cooled near wall turbine airfoil cooling design, the airfoil internal cavity has been used as cooling air passages or as a source cavity for supplying cooling air to various sections of the airfoil for the cooling system design. FIG. 3 shows a cross sectional view of a prior art near wall airfoil cooling design. A 5-pass counter flowing serpentine flow circuit is used in the airfoil mid-chord cavity to provide the airfoil tip section and suction wall cooling.

FIG. 4 shows another prior art near wall cooling design that utilizes the mid-chord cavity as a cooling source to provide cooling air to various sections of the airfoil for its cooling system design. Once the internal cavity is used as part of the cooling system, the inner wall of the double wall cooling structure will submerge in the coolant and become a cold structure membrane. Subsequently, it induces high thermal gradient for the dual wall cooling structure and yields a low component fatigue life. In addition, the airfoil internal cavity becomes a pressure vessel and a blade tip cap plus multiple internal ribs connecting the airfoil pressure side and suction side wall are required to ensure the structural integrity of the airfoil.

The above thermal mechanical fatigue (TMF) problem associated with the double wall turbine airfoil cooling design can be alleviated by incorporating the highly cooled turbine airfoil cooling design of the present invention into the prior art near wall airfoil cooling design.

It is an object of the present invention to provide for a turbine airfoil with a near wall serpentine flow cooling circuit which will optimize the use of main stream pressure gradient and two piece laminated blade construction.

It is another object of the present invention to provide for a turbine blade with near wall cooling that does not use a blade tip cap or internal cold ribs for support.

BRIEF SUMMARY OF THE INVENTION

A turbine blade having near wall serpentine flow cooling circuits with two separate 5-pass serpentine circuits for the airfoil leading edge and mid-chord regions. A 5-pass aft flowing serpentine circuit provides the cooling for the airfoil leading edge cooling and also serpentine the cooling air to the pressure side of the airfoil. A 5-pass forward flowing serpentine circuit is located on the suction side of the airfoil and is used for cooling the suction side surface of the airfoil. The blade is formed as two pieces with one piece having the aft flowing serpentine pressure side circuit, and the second piece having the forward flowing serpentine circuit for the suction side, the two pieces being bonded together by a transient liquid phase (TLP) bonding technique. The aft flowing serpentine cooling flow circuit is used for the airfoil leading edge and the pressure side surface will maximize the use of cooling to main stream gas side pressure potential as well as tailoring the airfoil external heat load. Cooling air is supplied at the airfoil leading edge section where the airfoil heat load is the highest, and then flows serpentine through the pressure side surface where the heat load is low, thus eliminating the use of film cooling holes at the forward region of the pressure side surface. The spent cooling air is discharged at the aft section of the airfoil through a near wall pin fin channel where the gas side pressure is low, yielding a high cooling air to main stream pressure potential to be used for the serpentine channels and maximize the internal cooling supply pressure requirement and lower leakage flow than the forward flowing serpentine design. The 5-pass forward flowing serpentine provides the cooling for the suction side of the airfoil and also provides the cooling air for the airfoil trailing edge near wall pin fin channel cooling. The forward flowing serpentine cooling flow circuit used for the airfoil suction surface will maximize the use of cooling air. Cooling air is supplied at down-stream of the airfoil suction surface where the airfoil heat load is high. The cooling air flows forward picking up heat and then is discharged to the airfoil external surface as film cooling air. This counter flowing cooling design maximizes the use of cooling air and provides a very high overall cooling efficiency for the airfoil suction surface.

Use of a two piece near wall serpentine flow cooling circuit for the blade cooling design eliminates the blade back flow margin (BFM) issue, cooling flow mal-distribution problem, increases cooling design flexibility, and minimizes cooling scheme sensitivity due to geometry and mainstream variations. The use of capless blade design also improves the near wall thermal metal fatigue (TMF) life capability.

DETAILED DESCRIPTION OF THE INVENTION

Figure 1:
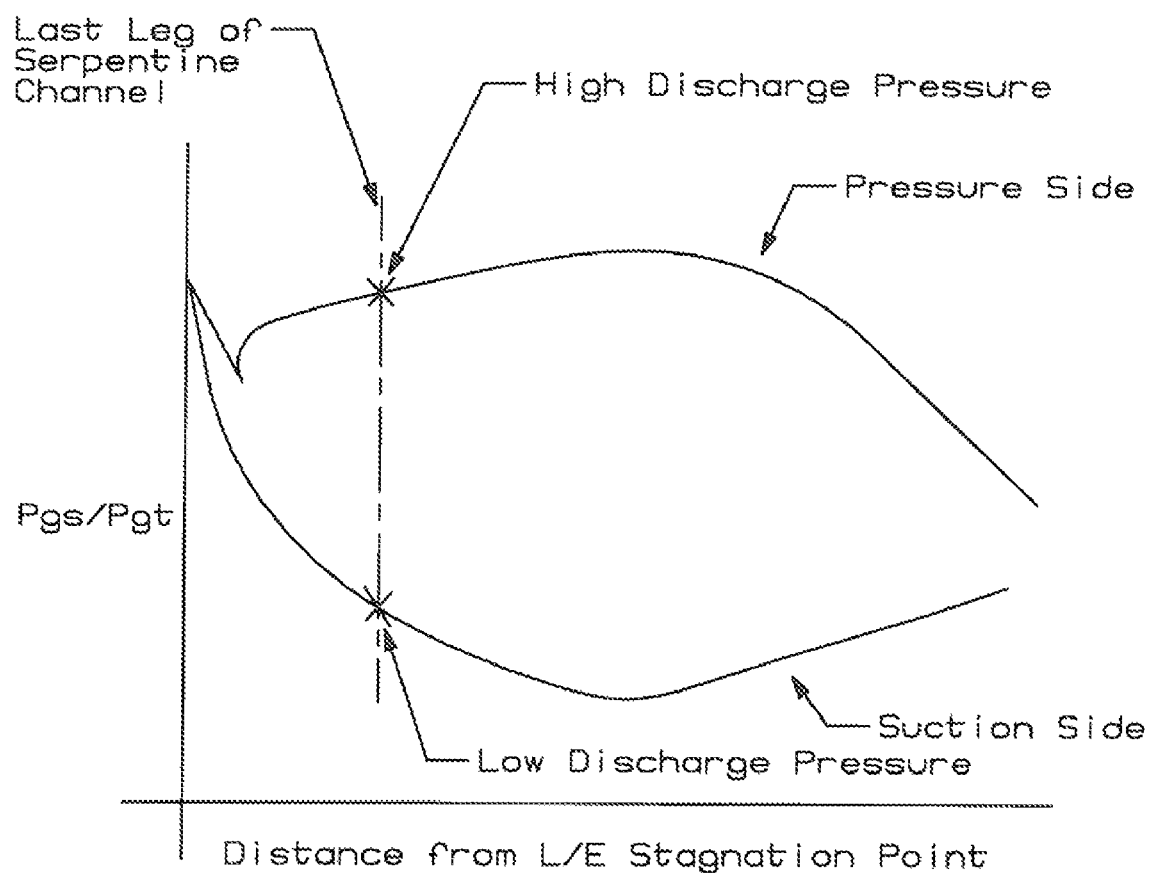
FIG. 1 is a graph of the external pressure profile on a standard turbine blade.
Figure 2:
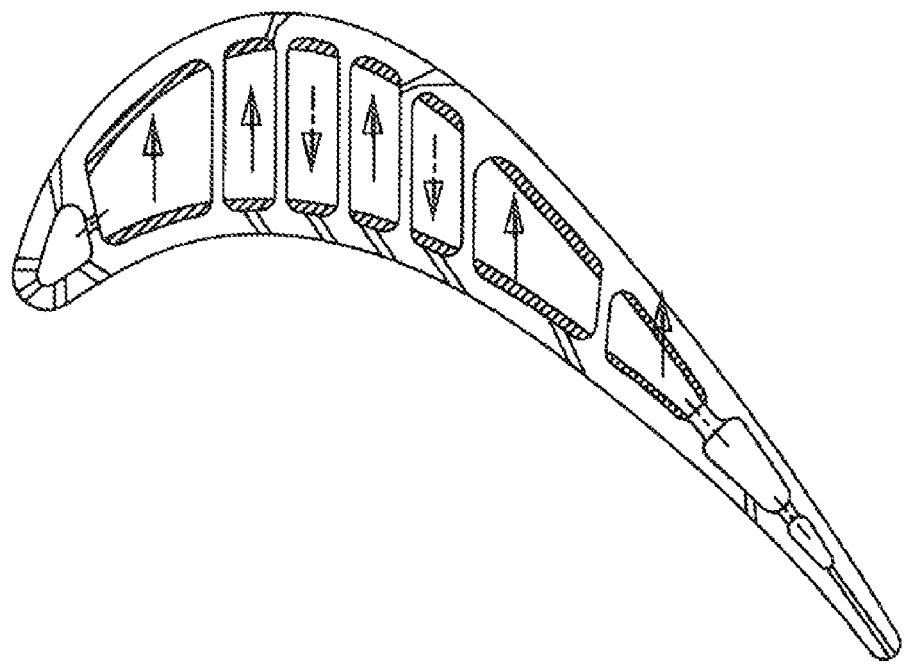
FIG. 2 is a prior art turbine blade with a 1+5+1 serpentine flow cooling circuit.
Figure 2:
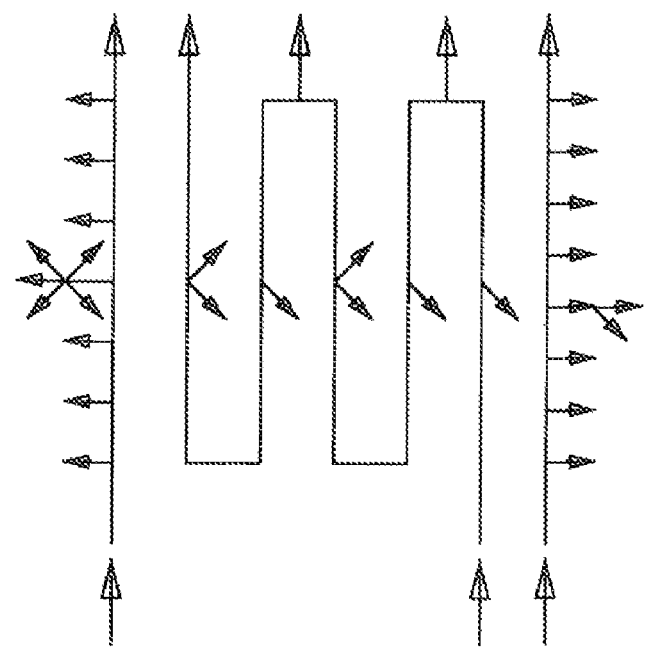
Figure 3:
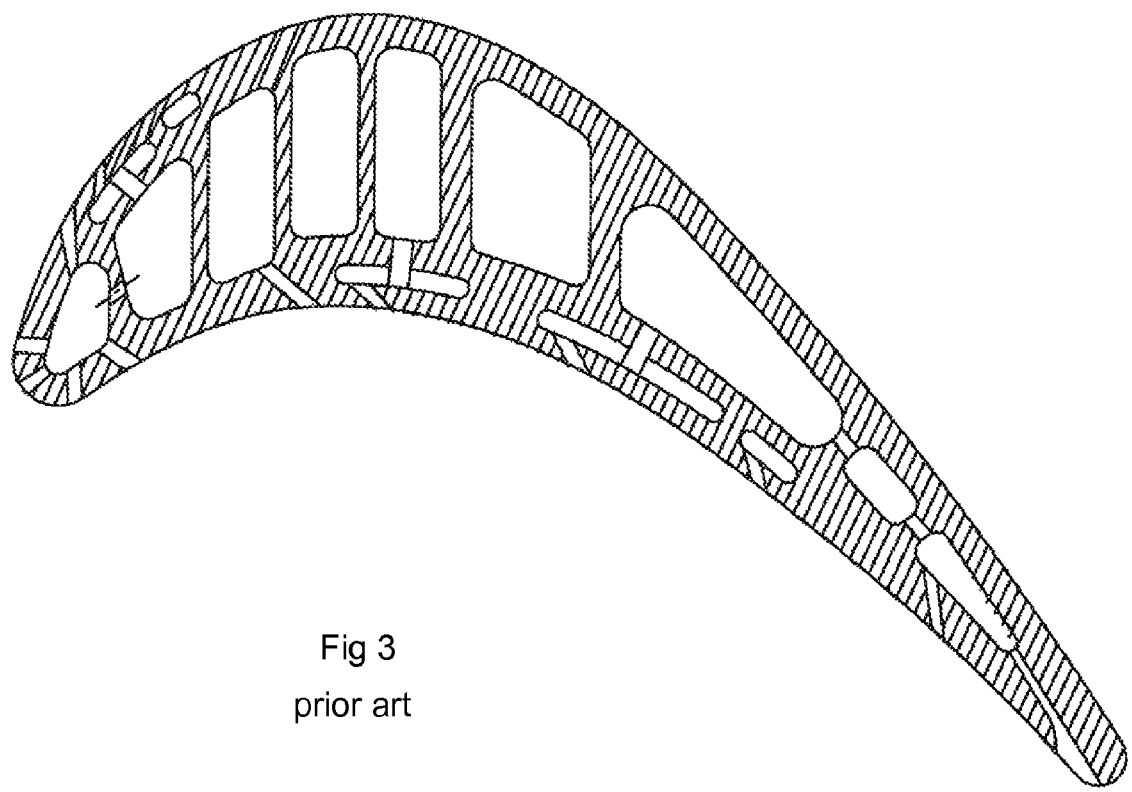
FIG. 3 is a cross section view of a prior art turbine blade cooling circuit.
Figure 4:
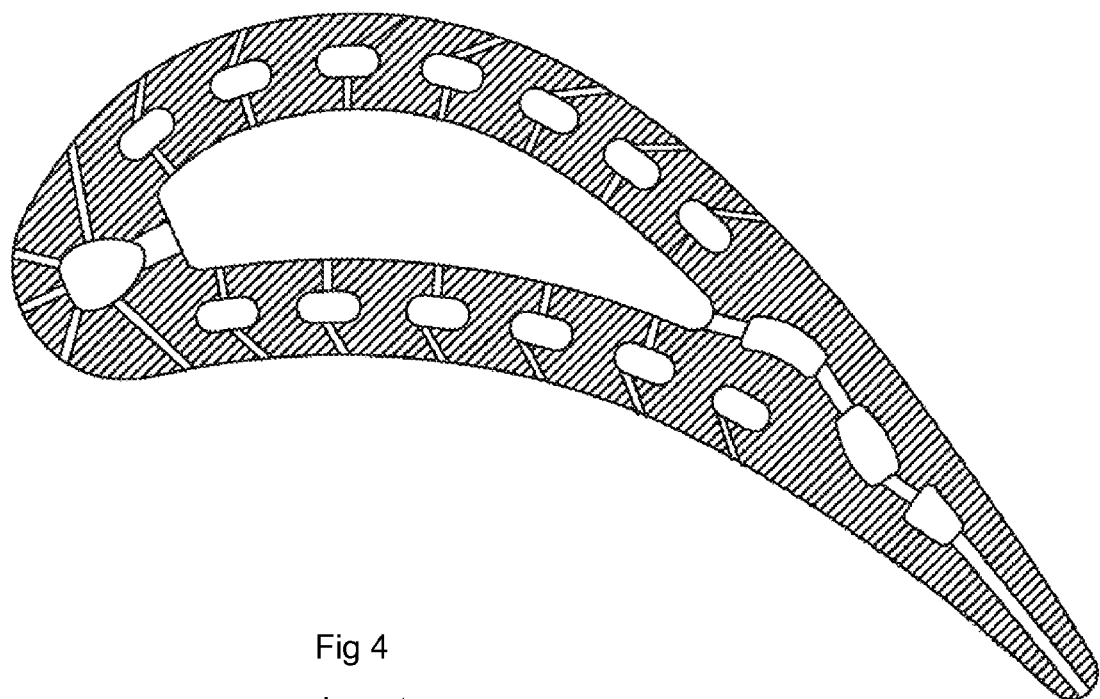
FIG. 4 is a cross section view of another prior art turbine blade cooling circuit.
Figure 5:
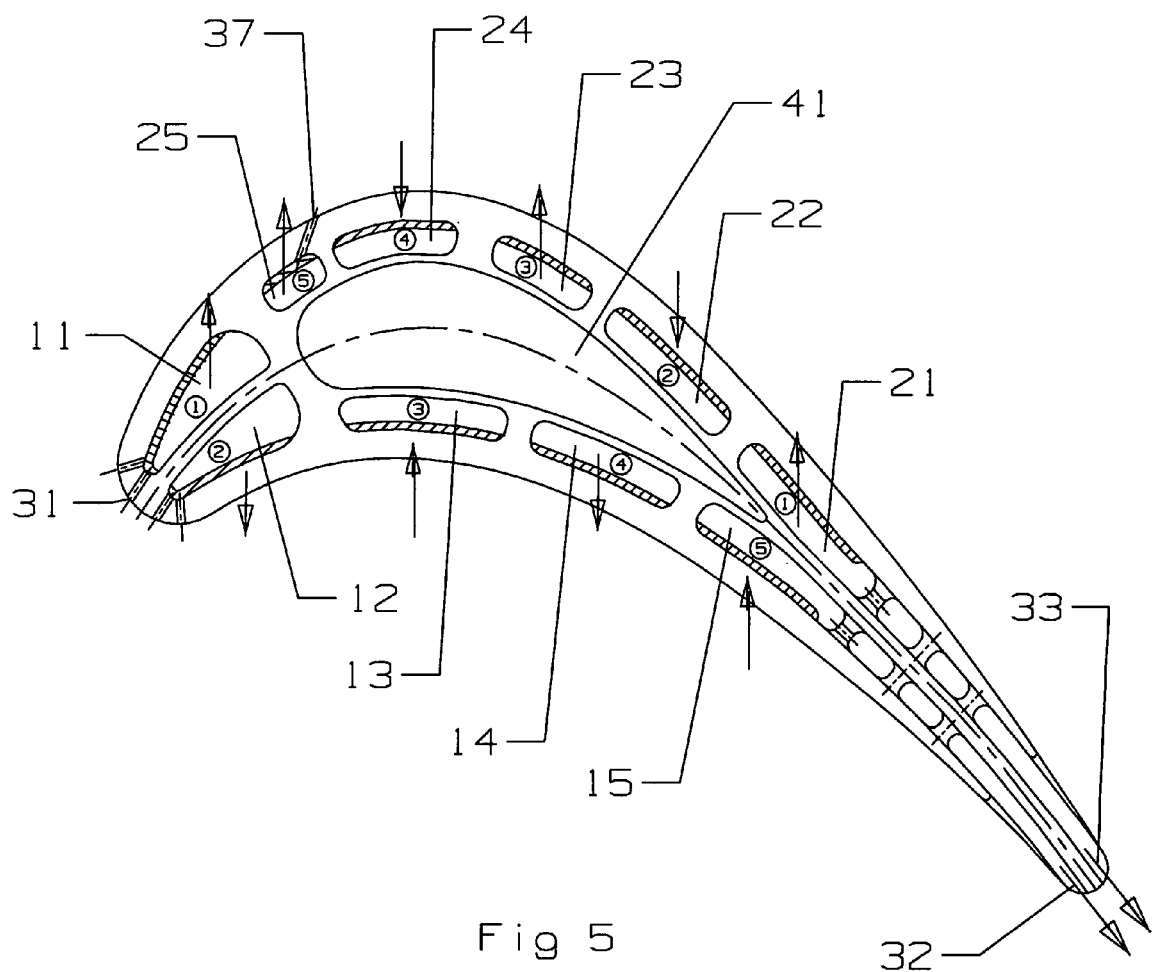
FIG. 5 is a top view of a cross section of the turbine blade cooling circuit of the present invention.
Figure 6:
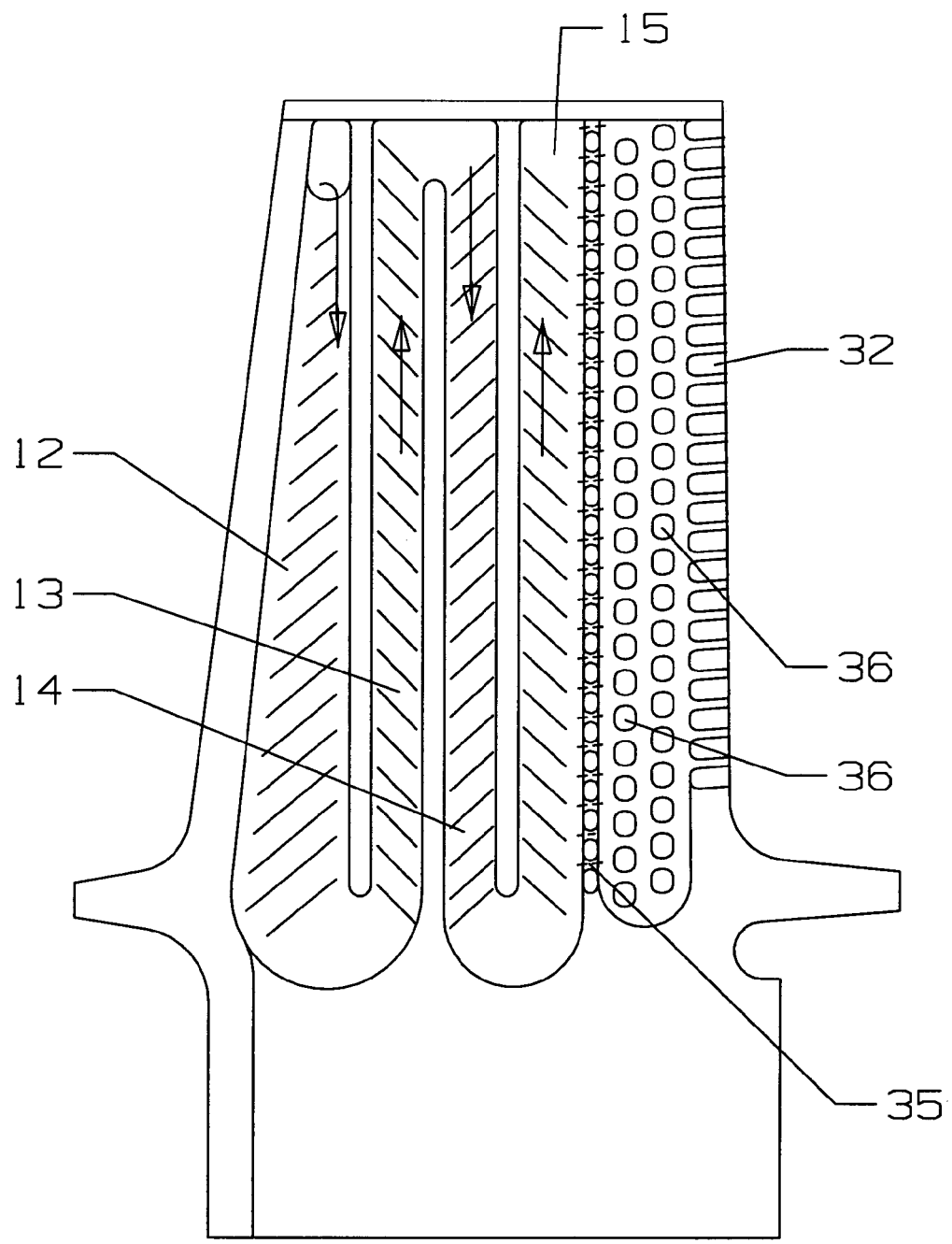
FIG. 6 is side view through a cross section of the present invention through the pressure side piece of the blade.
Figure 7:
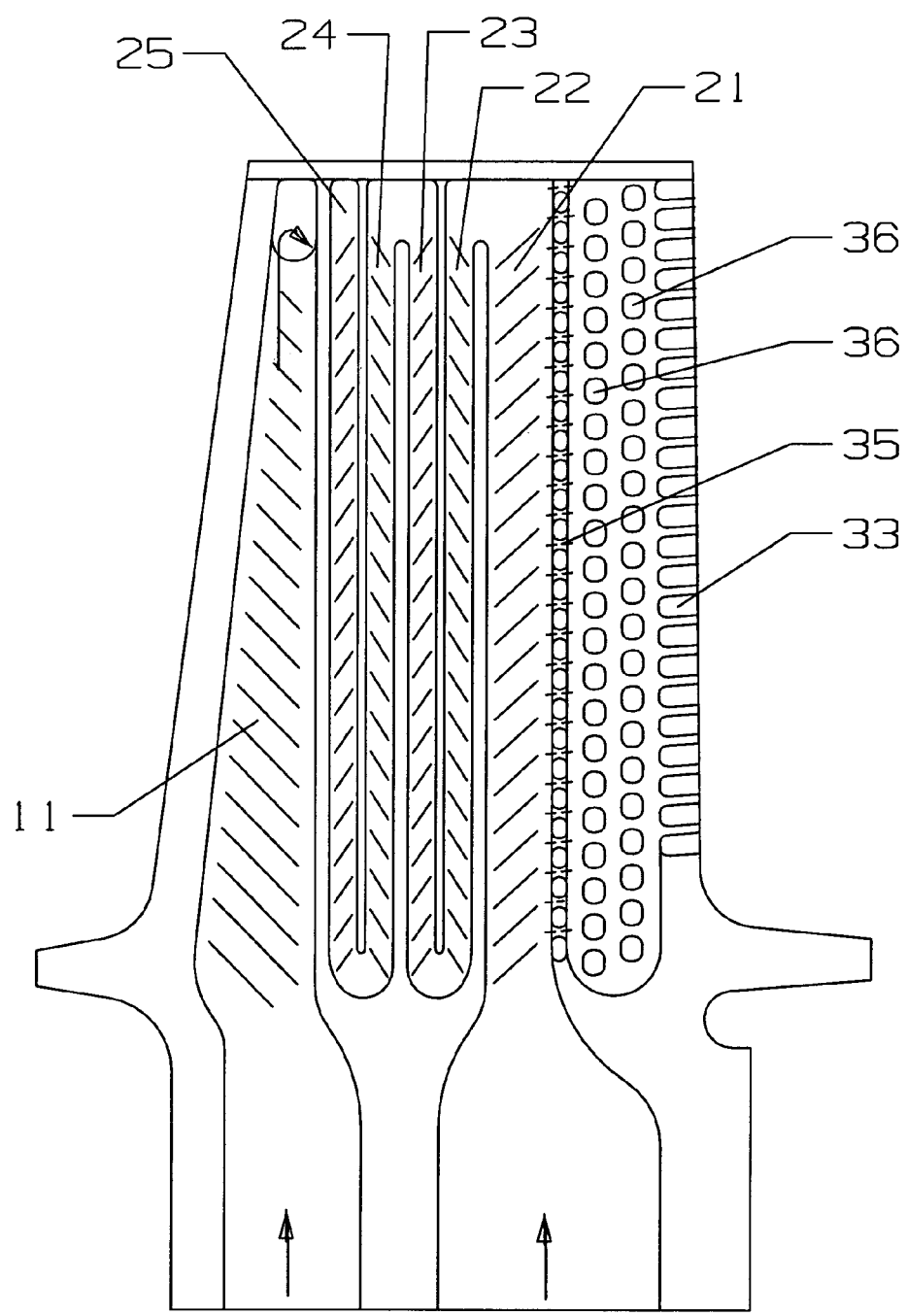
FIG. 7 is side view through a cross section of the present invention through the suction side piece of the blade.

The present invention discloses a turbine blade used in an industrial gas turbine engine. However, the inventive concept of the present invention could be applied to a stator vane or to an airfoil in an aero engine used to power an aircraft. The turbine blade of the present invention is shown in FIGS. 5 through 7 and in which the blade is formed from two pieces that are joined along the mid-chord line passing from the leading edge to the trailing edge. The blade includes two separate 5-pass serpentine flow cooling circuits with one 5-pass serpentine circuit located along the leading edge and the pressure side of the blade, and the second serpentine circuit located along the trailing edge of the blade. FIG. 5 shows these two separate serpentine flow circuits.

The pressure side serpentine circuit includes a first leg 11 extending along the blade leading edge on the suction side and includes two rows of film cooling holes 31 along the suction side of the leading edge region to provide film cooling. The second leg 12 is located also on the leading edge region but on the pressure side, and also includes two rows of film cooling holes 31. The third leg 13 is located on the pressure side of the blade and downstream from the second leg 12. The fourth leg 14 and the fifth leg 15 are located on the pressure side and downstream from the third leg. Cooling air supplied to the blade passes into the first leg 11 as seen in FIG. 5 and serpentines through the blade from the first leg 11 and then into the second leg 12, third leg 13, fourth leg 14 and fifth leg 15 in series as seen in FIG. 6. Pressure side exit cooling holes or slots 32 are spaced along the trailing edge of the blade as seen in FIGS. 5 and 6, and are connected to the fifth and last leg 15 of the pressure side serpentine circuit. A row of metering holes 35 formed within a rib extends along the side of the fifth leg 15, and two rows of pin fins 36 form cooling air passages between the fins to increase the heat transfer effect for the cooling air. The cooling air supplied to the blade passes into the first leg 11 and flows through the pressure side serpentine circuit through legs 12 through 15, and then is discharged out through the pressure side exit slots 32.

The second serpentine circuit includes a first leg 21 located along the suction side of the blade adjacent to the trailing edge region, a second leg 22, a third leg 23, a fourth leg 24 and a fifth leg 25 creating a forward flowing 5-pass serpentine circuit. As seen in FIG. 7, the trailing edge of the suction side serpentine flow circuit includes a row of exit slots 33 spaced along the trailing edge of the blade and on the suction side. A row of metering holes 35 in the rib extending along the first leg 21 and two rows of pin fins 36 form cooling air passages from the first leg 21 to the exit ducts 33 on the suction side of the trailing edge. Cooling air is supplied to the first leg 21 of the suction side serpentine circuit in the blade root as shown in FIG. 7, and flows through the second leg 22, third leg 23, fourth leg 24 and fifth leg 25, finally exiting through a row of film cooling holes 37 extending along the suction side and connected to the fifth leg 25 of the suction side serpentine circuit. Cooling air also exits the suction side exit slots from some of the cooling air that is diverted from the first leg 21 and through the metering holes 35.

As seen in FIG. 5, the blade is formed from two pieces that are bonded together along the blade mid-chord line (also referred to as the chamber line) represented in FIG. 5 by the dashed line. A hollow open cavity 41 is formed between the two pieces between the pressure side and the suction side pieces and extends from the root section to the tip section. However, the blade could be made without the cavity 41 in which the blade chamber line passes through solid metal material from the leading edge to the trailing edge regions. The blade is cast as the two pieces with the serpentine flow circuit and exit ducts in the one piece, and then bonded together by the well known transient liquid phase bonding technique (TLP) using thin sheets of boron material in them. Trip strips are included in the legs of the two serpentine flow circuits to improve the heat transfer efficiency. Additional film cooling holes can be included on any of the legs on the pressure or suction side of the blade to improve the film cooling of the blade is required.

The features and advantages of the new cooling circuit of the present invention are described below. The two pieces near wall serpentine blade cooling design sub-divides the blade into two separate pieces: the blade leading edge region and blade pressure section, and blade suction side section and blade trailing edge region. Each individual cooling section can be independently designed based on the local heat load and aerodynamic pressure loading conditions. The pressure side serpentine initiated at the leading edge region of the airfoil and ending at the aft portion of the pressure side trailing edge section, thus lowering the required cooling supply pressure and reducing overall blade leakage flow. The pressure side flow circuit is separated from the suction side flow circuit and therefore eliminates the blade mid-chord cooling flow mal-distribution due to film cooling flow mad-distribution, film cooling hole size, and mainstream pressure variation. The pressure side flow circuit is separated from the suction side flow circuit and therefore eliminates the back flow margin (BFM) and high blowing ratio for the blade suction side film cooling holes. Sub-dividing the blade into two different zones increases the design flexibility to redistribute cooling flow and/or add cooling flow for each zone and therefore increases the growth potential for the cooling design. An open mid-chord cavity for a near wall cooling design allows some hot gas recirculation within the open cavity that will tend to heat up the near wall cooling channel inner wall. This translates into a reduction of thermal gradient between the inner and outer wall to improve the blade thermal metal fatigue capability. An open mid-chord cavity for a near wall cooling design allows the hot gas to pressurize the inner cavity which allows for minimizing the pressure gradient across the airfoil wall. Eliminate the blade tip cap and internal support ribs to reduce the blade overall weight and pull stress. An open blade mid-chord cavity with the use of two piece blade construction manufacture approach allows for the internal inspection of blade inner wall thickness. The open mid-chord cavity may function as a deep squealer pocket that may reduce the blade leakage flow. Dual trailing edge discharge cooling channels provide more uniform airfoil trailing edge metal temperature and eliminate the airfoil suction side over temperature problem. Dual submerged cooling channels minimizes shear mixing and therefore lowers the aerodynamic loss and maintains high film cooling effectiveness for the airfoil trailing edge. Dual submerged cooling channels reduce the airfoil trailing edge thickness and therefore lower the airfoil blockage and increases aerodynamic performance.

I claim:

1. A turbine airfoil for use in a gas turbine engine, the airfoil comprising:
   an airfoil pressure side piece extending from the root to the tip of the blade and having a first serpentine flow cooling circuit therein;
   an airfoil suction side piece extending from the root to the tip of the blade and having a second serpentine flow cooling circuit therein;
   a bond formed between the two pieces to form a single turbine airfoil;
   a first row of pressure side exit holes on the trailing edge of the blade in fluid communication with the first serpentine flow cooling circuit; and,
   a second row of suction side exit holes on the trailing edge of the blade in fluid communication with the second serpentine flow cooling circuit.

2. The turbine airfoil of claim 1, and further comprising:
   the first row of pressure side exit holes and the second row of pressure side exit holes are each connected to the respective serpentine flow circuit through a row of metering holes and at least one row of pin fins to promote the heat transfer effect to the cooling air.

3. A turbine airfoil for use in a gas turbine engine, the airfoil comprising:
   an airfoil pressure side piece extending from the root to the tip of the blade and having most of a first serpentine flow cooling circuit therein;
   an airfoil suction side piece extending from the root to the tip of the blade and having a second serpentine flow cooling circuit therein;
   a bond formed between the two pieces to form a single turbine airfoil; and
   the first serpentine flow cooling circuit includes a first leg on the suction side of the leading edge region of the airfoil, and a second leg on the pressure side of the leading edge region of the airfoil.

4. The turbine airfoil of claim 3, and further comprising:
   the second serpentine flow cooling circuit includes a first leg adjacent to the trailing edge region of the airfoil and a last leg adjacent to the first leg of the first serpentine flow cooling circuit.

5. The turbine airfoil of claim 4, and further comprising:
   the last leg of the second serpentine flow cooling circuit includes a row of film cooling holes to discharge film cooling air to the suction side surface of the airfoil.

6. The turbine airfoil of claim 4, and further comprising:
   the first and second serpentine flow circuits are both five pass serpentine flow circuits.

7. A turbine airfoil for use in a gas turbine engine, the airfoil comprising:
   an airfoil pressure side piece extending from the root to the tip of the blade and having a most of a first serpentine flow cooling circuit therein;
   an airfoil suction side piece extending from the root to the tip of the blade and having a second serpentine flow cooling circuit therein;
   the first serpentine flow cooling circuit being an aft flowing cooling circuit;
   the second serpentine flow cooling circuit being a forward flowing cooling circuit;
   the first and second serpentine flow cooling circuits are formed as separate cooling circuits having respective inlets located in the root of the blade; and,
   a bond formed between the pressure side and suction side pieces to form a single turbine airfoil.

8. The turbine airfoil of claim 7, and further comprising:
   the bond is formed between the two airfoil pieces at the airfoil chamber line.

9. The turbine airfoil of claim 7, and further comprising:
   The first and second serpentine flow circuits are both five pass serpentine flow circuits.

10. The turbine airfoil of claim 7, and further comprising:
    a first row of pressure side exit holes on the trailing edge of the blade in fluid communication with the first serpentine flow cooling circuit; and,
    a second row of suction side exit holes on the trailing edge of the blade in fluid communication with the second serpentine flow cooling circuit.

11. The turbine airfoil of claim 7, and further comprising:
    the first serpentine flow cooling circuit includes a first leg on the suction side of the leading edge region of the airfoil and a second leg on the pressure side of the leading edge region of the airfoil.

\* \* \* \* \*